Feb. 25, 1941.  C. T. MANLEY  2,232,954
CORN POPPING APPARATUS
Filed Oct. 20, 1939  2 Sheets-Sheet 1

INVENTOR
Charles T. Manley.
BY
ATTORNEY

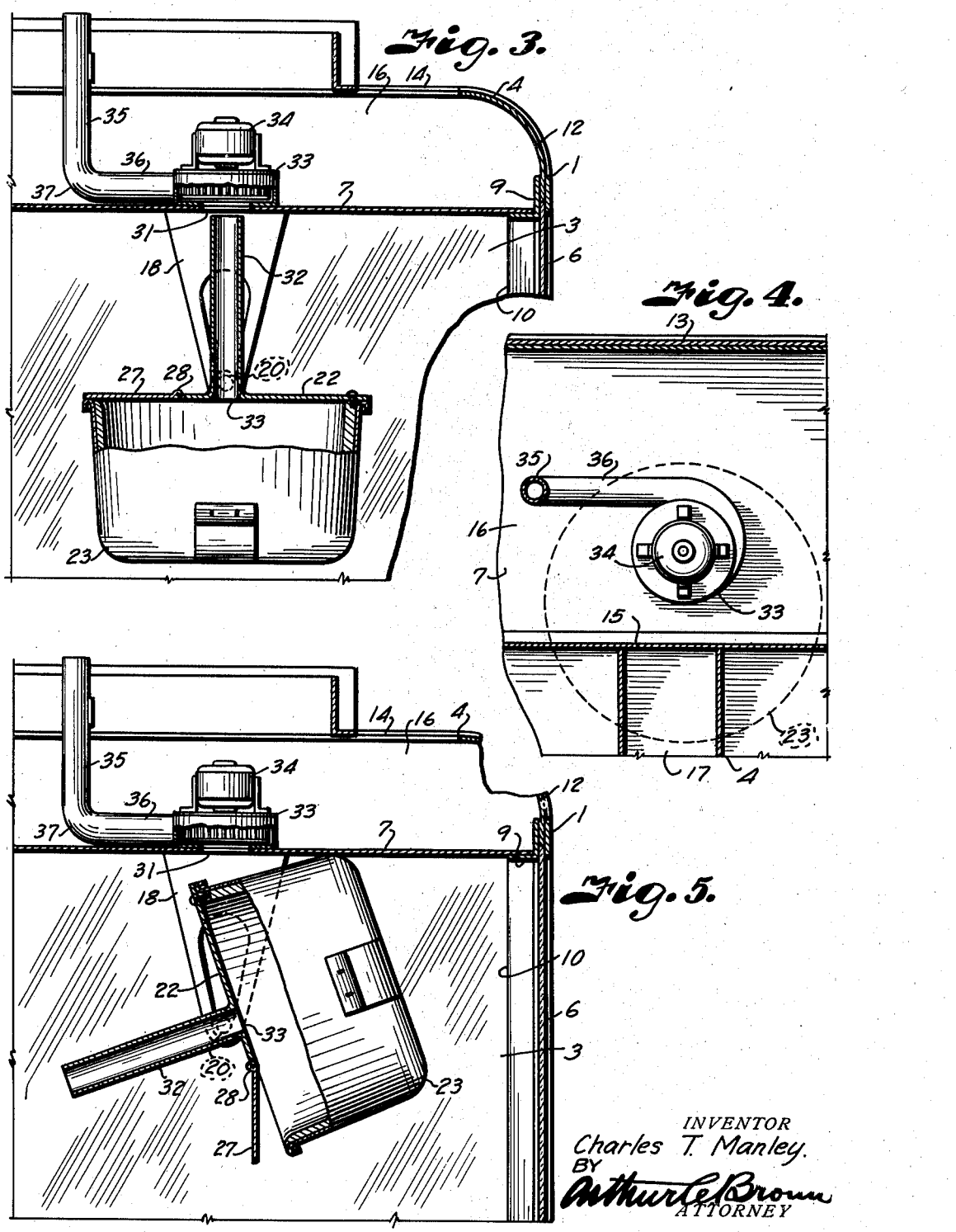

Patented Feb. 25, 1941

2,232,954

UNITED STATES PATENT OFFICE 2,232,954

CORN POPPING APPARATUS

Charles T. Manley, Kansas City, Mo., assignor to Burch Manufacturing Company, Kansas City, Mo., a corporation of Missouri Application October 20, 1939, Serial No. 300,372

5 Claims. (Cl. 53—4)

This invention relates to corn popping apparatus, and more particularly to an arrangement for ventilating the same, the principal object of the invention being to provide for substantially evacuating odor and grease bearing fumes from a display compartment in the general apparatus, and to exhaust soot and smoke bearing fumes from the corn cooking device of the general apparatus in such a manner that such fumes are prevented from adversely affecting the display or other functions of the general apparatus.

Other important objects of the present invention are to provide for allowing the ventilating apparatus to operate in any of several positions of the corn cooking apparatus; to provide for simultaneously dissipating odors and soiling fumes from the display and cooking portions of a corn popping apparatus; to provide for exhausting deleterious fumes from the corn cooking apparatus while the corn cooking apparatus is opened relative to the display portion of the corn popping apparatus; to provide for utilizing fumes exhausted from the corn popping apparatus for advertising and other purposes; to provide improved elements and arrangements of them in a device for ventilating corn popping apparatus; and to provide a simple, relatively economical and highly efficient ventilating apparatus for the purposes indicated.

In accomplishing these and other objects of the present invention, I have provided improved details of structure, the preferred form of which is illustrated in the accompanying drawings, wherein:

Fig. 3 is a detail vertical cross-section through the corn popping apparatus illustrated in Fig. 1, substantially on the line 3—3, Fig. 2, and particularly illustrating a cooking element.

Fig. 4 is a detail horizontal cross-section through the top of the corn popping apparatus substantially on the line 4—4, Fig. 2, and particularly illustrating the exhaust duct for the blower.

Fig. 5 is a vertical cross-section similar to Fig. 3, but illustrating the cooking device in tilted condition with the cooking device exhaust duct spaced from the gas outlet of the display compartment.

Figure 1:
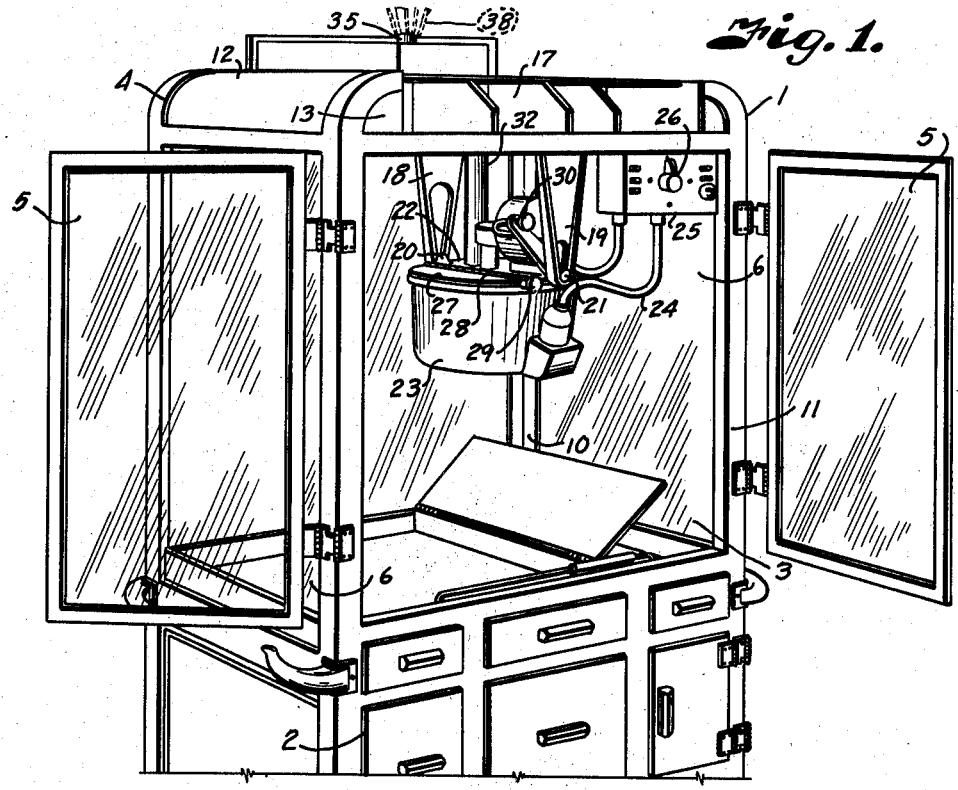
Fig. 1 is a fragmentary perspective view of a corn popping apparatus showing an arrangement of a ventilating apparatus embodying my invention relative thereto.

Referring more in detail to the drawings:

I, Fig. 1, designates a corn popping apparatus embodying the features of the present invention, which preferably consists of juxtaposed structural members suitably partitioned to provide storage compartments 2, a display compartment 3 and a roof or hood element 4.

The structural members defining the display compartment 3 are preferably connected by transparent hinged or fixed panels 5 and 6, through which popped corn in the display compartment may be easily observed, and through which access may be had for cooking and dispensing operations on the corn.

Figure 2:
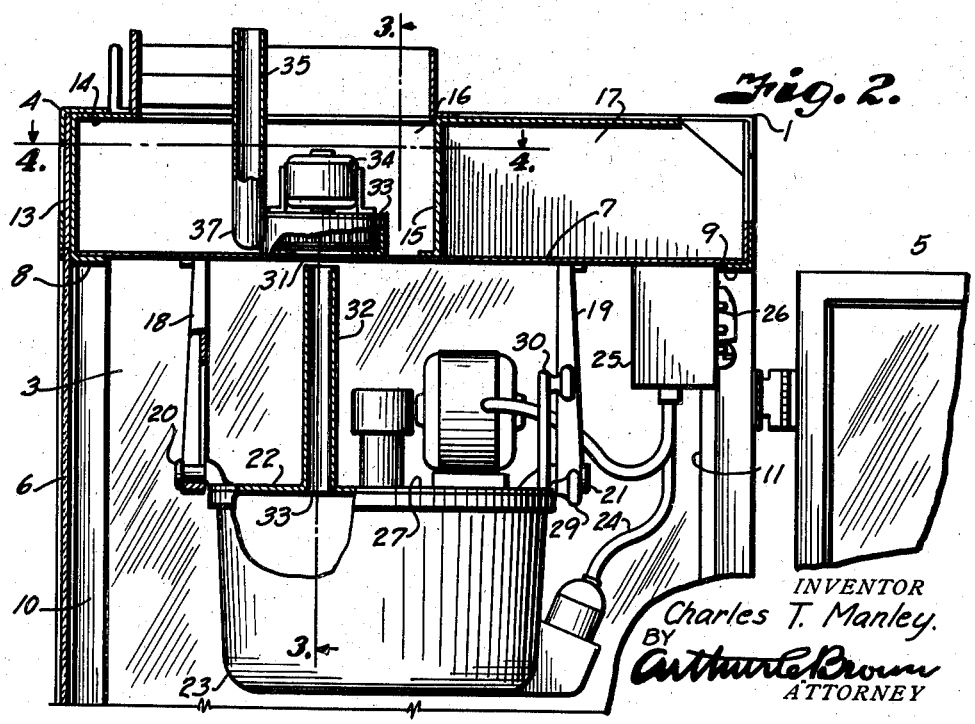
Fig. 2 is a detail vertical cross-section through the corn popping apparatus illustrated in Fig. 1, particularly illustrating the relation of the cooking and display portions of the apparatus to a blower for dissipating fumes in the corn popping apparatus.

The hood element 4 of the apparatus preferably consists of a bottom wall 7, Fig. 2, having its sides mounted on structural members 8 and 9 suitably fixed to and supported by vertical structural members 10 and 11. Side and end walls 12 and 13 for the hood element are suitably built up from the bottom wall 7 and structural members 8 to 11, inclusive. A top wall 14 is provided to substantially enclose the hood element 4 and a vertically arranged partition 15 is also preferably provided to divide the hood element into compartments 16 and 17.

Mounted on the bottom wall 7 of the cap element and depending therefrom into the storage compartment 3 are spaced standards 18 and 19 having bearing openings at their lower ends, preferably in alignment, for receiving trunnions 20 and 21 which are suitably fixed, preferably in oppositely disposed relation, on the top wall 22 of a cooking element, such as a kettle 23. The kettle 23 may be of suitable material and construction, the principal requisite of which is that it be capable of holding a sufficient amount of popcorn to produce adequate quantities of popped corn when heated as by a suitable heating element, not shown, in the bottom of the kettle, which may be controlled through connections 24 with a control box 25 mounted in the corn popping apparatus, preferably within the display compartment thereof, as clearly shown in Fig. 1, and having suitable switches 26 for energizing and deenergizing the various mechanisms of the corn popping apparatus and particularly the heating or cooking element in the kettle.

A cover 22 is preferably fixed to the kettle, and in order to provide access to the interior of the kettle, the portion 27 thereof is hinged, as at 28, in such a manner that the portion 27 may be lifted and lowered at will to pour popcorn into the kettle and popped corn out of the kettle.

A handle 29 is preferably provided on the hinged portion 27 of the cover for facilitating opening and closing the kettle, and an actuating member in the form of a lever 30 is mounted on the fixed portion of the kettle top wall 22 which may be manipulated to tilt the kettle on its trunnions 20 and 21 to the position illustrated in Fig. 5 for emptying the kettle of its contents.

When corn is popped in apparatus of this character, a seasoning oil is customarily employed to condition the corn and render the same more palatable. The oil, when heated, produces fumes, smoke, grease, and the like which, if not effectively dissipated, emanate from the kettle toward the transparent panels of the display compartment and discolors the same to an extent that the display functions of the display compartment are impaired.

The fumes produced by cooking the seasoned popped corn also have an unpleasant odor which, if also not effectively evacuated or exhausted from the apparatus, impair the sales appeal of the popcorn to be dispensed from the apparatus.

In order to overcome the difficulties noted and to effecitvely exhaust fumes and greases carried thereby from the apparatus, an opening 31 is provided in the bottom wall 7 of the hood element 4 of the apparatus, and an exhaust duct 32 is mounted on the fixed cover portion 22 of the kettle, which duct opens, as at 33, into the interior of the kettle. The duct 32 is preferably of smaller diameter than the opening 31 in the wall 7 of the apparatus, and is preferably spaced below the opening in such a manner that, as cooking operations proceed, the heat developed thereby causes air currents to rise in the display compartment where they find an exit in the opening 31 about the duct 32. Grease carrying fumes in the kettle 23 also rise and are forced by their own relative lightness through the opening 31 into the compartment 16 in the hood element.

In order to more effectively dissipate the undesirable fumes generated in the display compartment, a blower 33 is mounted in the compartment 16 over the opening 31 in such a manner that fumes enter the blower and upon actuation of the blower by a suitable prime mover, such as an electric motor 34, are picked up and blown through a duct 35, the duct 35 preferably being extended laterally of the blower as at 36, Fig. 4, and then turned upwardly as at 37, Fig. 3, to discharge the fumes into the atmosphere exteriorly of the corn popping apparatus. It is contemplated that the fumes issuing from the duct 35 may be collected and utilized, for example, to fill balloons and/or to animate streamers or advertising devices by the energy contained in the fumes so collected, as at 38, Fig. 1.

It is apparent that suitable connections may be made between the motor 34 and the control box 25 in the display compartment of the apparatus in such a manner that the blower may be energized or deenergized at the will of the operator of the apparatus by suitable manipulation of switches on and in the control box.

The operation of a corn popping machine, and particularly the ventilating arrangement therefor is as follows:

The handle 29 on the hinged cover of the kettle may be manipulated to open the kettle so that popcorn and seasoning oil in suitable quantities may be applied to the kettle. The switch 26 may then be manipulated to energize the kettle heating element, whereupon heat is produced to cook or pop the corn in the kettle.

As the heat is increased, fumes are released from the oil and corn, which rise upwardly in the kettle and escape through the duct 32. The switch for the blower having been manipulated to energize the blower, the blower creates a suction on the duct and aids in exhausting the fumes from the kettle by forcing the same through the duct 35 to atmosphere.

Fumes escaping from the kettle due, for example, to leakage, pass the hinged portion of the kettle cover and the possible partial opening of the hinged portion of the cover, due to the popping action of the corn in the kettle, also rise toward the top of the display compartment and are sucked through the blower through the opening 31 along with the fumes passing through the duct 32 for effectively evacuating the fumes from the display compartment of the corn popping apparatus.

When the popped corn has been sufficiently popped, the lever 30 may be manipulated to pivot the kettle on its trunnions from the position illustrated in Fig. 3 to that illustrated in Fig. 5 and thus discharge the contents of the kettle onto the display compartment floor of the apparatus. Since the duct 32 is spaced below the opening 31, it does not contact with the bounding edges of the opening and the kettle is thus free to pivot at the will of the operator.

When the handle 30 is released, the kettle returns of its own accord to the normal position illustrated in Fig. 1, and the apparatus is prepared for another corn popping operation.

It is apparent, therefore, that I have provided for effectively exhausting grease and odor bearing fumes from the interior of corn popping apparatus in a convenient and highly efficient manner; that the appearance of the corn popping apparatus is enhanced by practice of the present invention by eliminating soot and grease normally collecting on the panels thereof; and that unpleasant odors are eliminated, thus enhancing the salability of the product dispensed from the apparatus.

What I claim and desire to secure by Letters Patent is:

1. In corn popping apparatus, a cabinet, a cooking element in the cabinet, and means for exhausting fumes simultaneously from the cabinet and cooking element.

2. In apparatus of the character described, a cabinet, a cooking element in the cabinet, a hood element on and communicating with the cabinet, and means in the hood element acting on the interior of the cabinet for withdrawing fumes from the cabinet.

3. In apparatus of the character described, a cabinet, a cooking element in the cabinet, means acting on the interior of the cabinet for withdrawing fumes from the cabinet, and means communicating the cooking element with the fume withdrawing means.

4. In apparatus of the character described, a cabinet, a kettle pivotally mounted in the cabinet having a portion allowing access to the interior of the kettle for filling and emptying the kettle, a duct opening from the interior of the kettle and extending toward the top of the cabinet and means communicating with and acting on said duct for transferring fumes passing through the duct to atmosphere.

5. In apparatus of the character described, a cabinet, a kettle pivotally mounted in the cabinet having a portion allowing access to the kettle for filling and emptying the kettle, a duct opening from the kettle and extending toward the top of the cabinet, means on the cabinet communicating with and acting on said duct for transferring fumes passing through the duct to atmosphere, and a support for said fume transferring means on the cabinet having an opening therein effecting communication between said means and duct, said opening being of larger diameter than the duct for admitting fumes from the cabinet simultaneously with fumes in the duct to said transfer means.

CHARLES T. MANLEY.